United States Patent
Li et al.

(10) Patent No.: US 11,488,278 B2
(45) Date of Patent: Nov. 1, 2022

(54) AUGMENTED PASSENGER VERIFICATION

(71) Applicant: Beijing DiDi Infinity Technology and Development Co., Ltd., Beijing (CN)

(72) Inventors: Dong Li, Santa Clara, CA (US); Huaiyu Zhu, Newark, CA (US); Junbo Shi, Beijing (CN); Deyu Hu, Palo Alto, CA (US); Jing Chen, Palo Alto, CA (US); Haocheng Zhang, Mountain View, CA (US)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 278 days.

(21) Appl. No.: 16/722,410

(22) Filed: Dec. 20, 2019

(65) Prior Publication Data

US 2021/0192665 A1    Jun. 24, 2021

(51) Int. Cl.
*G06Q 50/30* (2012.01)
*G06Q 10/06* (2012.01)
*G06F 16/25* (2019.01)
*H04L 9/40* (2022.01)

(52) U.S. Cl.
CPC ........... *G06Q 50/30* (2013.01); *G06F 16/252* (2019.01); *G06Q 10/06311* (2013.01); *H04L 63/102* (2013.01); *G06Q 2240/00* (2013.01)

(58) Field of Classification Search
CPC ............ G06Q 50/30; G06Q 10/06311; G06Q 2240/00; G06F 16/252; H04L 63/102
USPC .......................................................... 705/13
See application file for complete search history.

(56) References Cited

U.S. PATENT DOCUMENTS

| | | | |
|---|---|---|---|
| 9,934,625 B1 | 4/2018 | Wahba et al. | |
| 11,151,482 B2* | 10/2021 | Dyer | G06Q 50/10 |
| 2007/0082614 A1* | 4/2007 | Mock | H04W 88/02 |
| | | | 455/456.2 |
| 2010/0153279 A1 | 6/2010 | Zahn | |
| 2017/0309552 A1* | 10/2017 | Singleton | H04W 12/06 |
| 2018/0178737 A1* | 6/2018 | Studnicka | H04W 4/023 |
| 2018/0211543 A1* | 7/2018 | Wei | G06V 20/59 |
| 2018/0247037 A1* | 8/2018 | Weller | G06F 21/44 |
| 2021/0061224 A1* | 3/2021 | Kim | B60R 13/00 |

FOREIGN PATENT DOCUMENTS

| | | |
|---|---|---|
| CN | 107016849 A | 8/2017 |
| CN | 109711920 A | 5/2019 |
| CN | 110555536 A | 12/2019 |

OTHER PUBLICATIONS

Xhare-a-Ride: A Search Optimized Dynamic Ride Sharing System with Approximation Guarantee Published by IEEE (Year: 2017).*
PCT International Search Report and the Written Opinion dated Mar. 17, 2021, issued in related International Application No. PCT/CN2020/137583 (9 pages).

* cited by examiner

*Primary Examiner* — Zeina Elchanti
(74) *Attorney, Agent, or Firm* — Sheppard Mullin Richter & Hampton LLP (57) ABSTRACT

After determining a trip order has a high risk, verification information unavailable in a passenger information database system can be requested and provided for a passenger of the account. Validity of the verification information can be determined using a verification service and stored in a passenger information database. A decision for the trip order can be determined based on the validity of the verification information stored in the passenger information database.

18 Claims, 6 Drawing Sheets

AUGMENTED PASSENGER VERIFICATION

TECHNICAL FIELD

The disclosure relates generally to ridesharing platforms.

BACKGROUND

Under traditional approaches, ridesharing platforms may be able to connect passengers and drivers on relatively short notice. However, traditional ridesharing platforms suffer from a variety of safety and security risks for both passengers and drivers.

SUMMARY

One aspect of the present disclosure is directed to a ridesharing system. In some embodiments, the system comprises: one or more processors; and a memory storing instructions that, when executed by the one or more processors, cause the system to perform: receiving a trip order for a first account. The instructions, when executed by the one or more processors, cause the system to perform: determining the trip order has a high risk using a plurality of conditions associated with the trip order. The instructions, when executed by the one or more processors, cause the system to perform: requesting verification information unavailable in a passenger information database system being provided for a passenger of the first account. The instructions, when executed by the one or more processors, cause the system to perform: receiving a first indication that valid verification information has been provided for the passenger of the first account from the passenger information database system. The instructions, when executed by the one or more processors, cause the system to perform: determining a decision for the trip order based on the valid verification information provided for the passenger of the first account.

In some embodiments, the plurality of conditions comprises the trip order being a first trip order of the first account, a pickup time and/or a drop off time associated with the trip order being night time, the first account and/or the first trip order being associated with only a cash payment method, a pickup location and/or the drop off location associated with the trip order being an unsafe location, and/or a route from the pickup location to the drop off location passing through an unsafe area.

In some embodiments, determining the trip order has a high risk comprises: determining a risk associated with the trip order using the plurality of conditions associated with the trip order; and/or determining the risk is above a predetermined threshold.

In some embodiments, receiving the trip order comprises: receiving, from a passenger application associated with the first account, the trip order, and/or wherein requesting the verification information comprises: transmitting, to the passenger application, a request for the passenger application to be provided with the verification information unavailable in the passenger information database system.

In some embodiments, the passenger application is programmed to perform: receiving, from the ridesharing system, the request for the passenger application to be provided with the verification unavailable in the passenger information database system; requesting the passenger provide verification information; receiving, from the passenger, verification information; transmitting, to a verification system, the verification information received from the passenger; receiving, from the verification system, a second indication that the verification information received from the passenger is valid; and/or transmitting, to the ridesharing system, an updated trip order (or the trip order) for the first account. The ridesharing system can be programmed to perform: receiving the updated trip order for the first account. In some embodiments, the passenger application is programmed to: receiving, from the passenger, a request to transmit, to the ridesharing system, the updated trip order. Transmitting, to the ridesharing system, the updated trip order for the first account can comprise: responsive to receiving, from the passenger, the request to transmit, to the ridesharing system, the updated trip order. In some embodiments, the verification system is programmed to: determining the verification information received from the passenger application is valid using a payment processing system or an identification number verification system. A registration process of the payment processing system can require more and/or more stringent requirements than a registration process of the ridesharing system. A process of obtaining an identification number verifiable using the identification number verification system can require more and/or more stringent requirements than the registration process of the ridesharing system. In some embodiments, the verification system is programmed to: causing the verification information received from the passenger application, or a portion thereof, to be saved to the passenger information database system.

In some embodiments, the passenger application is programmed to perform: receiving, from the ridesharing system, the request for the passenger application to be provided with the verification unavailable in the passenger information database system; requesting the passenger provide verification information; receiving, from the passenger, verification information; transmitting, to an online system, the verification information received from the passenger; receiving, from the online system, a second indication that the verification information received from the passenger is valid; and/or causing the second indication that the verification information received from the passenger is valid to be saved to the passenger information database system. In some embodiments, the online system comprises a social media system. In some embodiments, an account creation process of the online system requires more and/or more stringent requirements than a registration process of the ridesharing system.

In some embodiments, the instructions, when executed by the one or more processors, cause the system to perform: receiving an updated trip order (or the trip order again) for the first account, wherein the updated trip order for the first account received is indicative of the valid verification information having been provided for the passenger of the first account.

In some embodiments, the verification information of the passenger comprises two or more types of verification information. In some embodiments, the two or more types of verification information comprise a credit card number and associated information, an identification number and associated information, and login information of an online system. In some embodiments, the verification information of the passenger comprises a state identification number, a national identification number, a passport number, a credit card number, an issuance date or month, an expiration date or month, an issuance authority, a date of birth, an address, or a combination thereof.

In some embodiments, determining the decision for the trip order comprises: determining the verification information being provided by the passenger of the first account is not associated with a second account; and/or assigning a driver for the trip order. In some embodiments, determining the decision for the trip order comprises: determining the verification information being provided by the passenger of the first account is associated with a second account; and/or declining the trip order, disabling the first account and/or the second account, and/or suspending the first account and/or the second account. In some embodiments, determining the decision for the trip order comprises: determining the verification information being provided by the passenger is consistent with passenger information in a passenger profile associated with the first account stored in the passenger information database system; and/or assigning a driver for the trip order. In some embodiments, determining the decision for the trip order comprises: determining the verification information being provided by the passenger is not consistent with passenger information in a passenger profile associated with the first account stored in the passenger information database system; and/or declining the trip order, disabling the first account, and/or suspending the first account.

Another aspect of the present disclosure is directed to a method for ridesharing. In some embodiments, the method is under control of a processor and comprises: transmitting, to a ridesharing system, a trip order of a first account. The method can comprise: receiving, from the ridesharing system, a request for verification information unavailable in a passenger information database system being provided for a passenger of the first account. The method can comprise: requesting the passenger to provide the verification information unavailable in the passenger information database. The method can comprise: receiving, from the passenger, the verification information requested. The method can comprise: determining the verification information received from the passenger is valid. The method can comprise: transmitting, to the ridesharing system, an updated trip order (or the trip order again) for the first account. The ridesharing system can be programmed to: receiving, from the passenger information database system, a first indication that valid verification information has been provided for the passenger of the first account. The ridesharing system can be programmed to: determining a decision for the trip order based on the valid verification information provided for the passenger of the first account.

In some embodiments, determining the verification information provided by the passenger is valid comprises: determining the verification information provided by the passenger is valid using a verification system or an online system.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may improve the safety and security of a ridesharing service. More specifically, for example, the approaches disclosed herein enable and/or improve driver and passenger safety in a ridesharing service, for example, by determining whether a trip order is suspicious and/or has a high risk. Incidents can make a trip unsafe. Incidents can include physical incidents (e.g., property losses and physical harms to drivers and passengers). For a trip order that is suspicious and/or has a high risk, the ridesharing service can ask the passenger to provide verification information via an application (e.g., mobile application) of the ridesharing service. As used herein, the application may be referred to as an "App." The verification information can include a credit card number and an associated expiration month. The verification information can include a national identification number and a date of birth of the person assigned the national identification number. The verification information can include login information of an online system, such as a social media system.

The App of the ridesharing service can determine the validity of the verification information using a verification service or a third party service. The verification service can in turn verify the validity of the verification information using a third party service. For example, the App of the ridesharing service can determine the credit card number and the associated expiration month match each other using a validation service, which in turn uses a third party service (e.g., a payment or credit card processing service), to verify the credit card number and the associated expiration month match each other. As another example, the App of the ridesharing service can determine the login information of an online system provided by the passenger is valid using an application program interface (API) and/or software development kit (SDK) of the online system. The App of the ridesharing service can save the verification information (e.g., a credit card number and an associated expiration month) to a passenger information database. Alternatively or additionally, the App of the ridesharing service can save an indication that the verification information (e.g., login information of an online system) provided by the passenger is valid to the passenger information database.

After the validity of the verification information is verified, the App of the ridesharing service can send an updated trip order or resend the trip order to the ridesharing service. The ridesharing service can determine a decision for the updated trip order or the resent trip order based on the verification information provided for the passenger of the account.

Passenger, Driver, and Ridesharing Platform System Interactions

Figure 1:
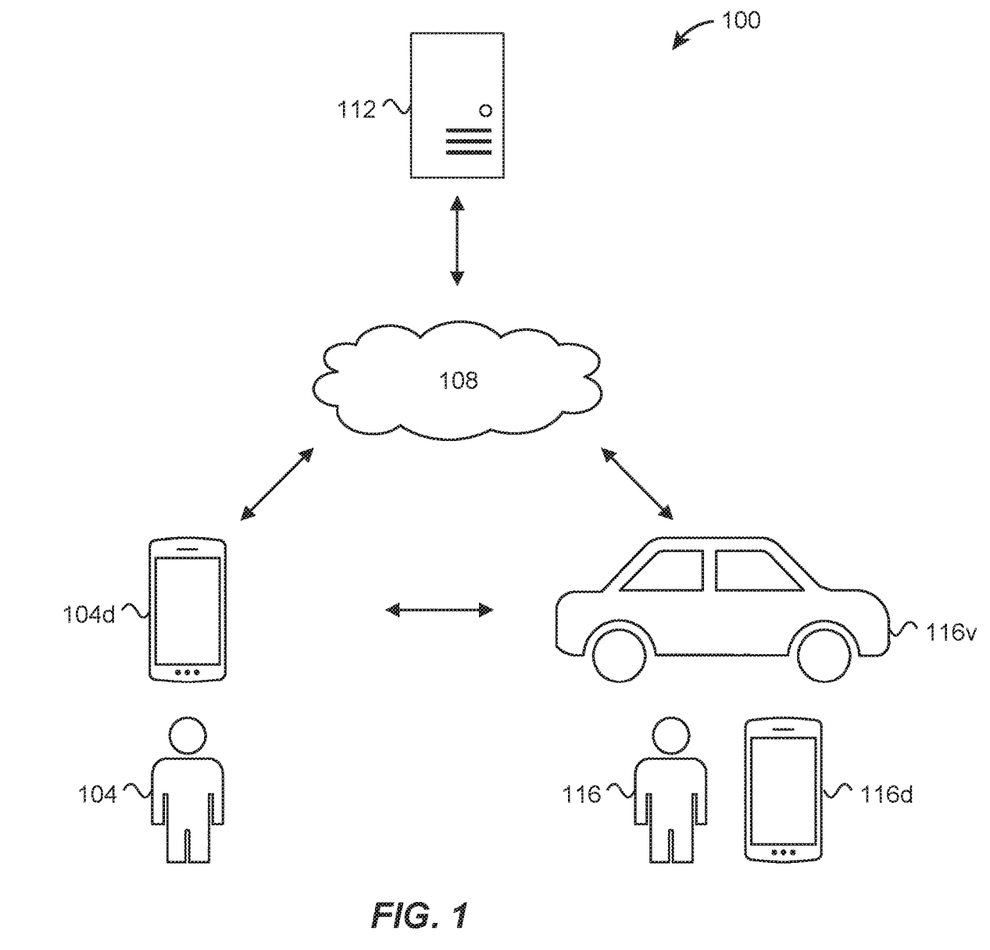
FIG. 1 illustrates an example environment for a ridesharing platform system, in accordance with various embodiments of the disclosure.

FIG. 1 illustrates an example environment for a ridesharing platform system. In the environment 100 illustrates in FIG. 1, a passenger 104 uses a passenger device 104*d* (e.g., a smartphone, a tablet, or a computer) to make a trip request, via a communication network 108 (e.g., the Internet) to a ridesharing platform system 112 (such as the computing system 200 described with reference to FIG. 2). The ridesharing platform system 112 can in turn assign a driver 116 and the driver's vehicle 116 (e.g., a car, a SUV, and a truck) to fulfil the trip request. The driver 116 can receive and accept or decline the trip request using a driver device 116*d* (e.g., a smartphone, a tablet, or a computer). The driver device 116*d* can be a standalone device or part of the driver's vehicle 116.

During an onboarding process, the passenger 104 and the driver 116 can provide personal information to the ridesharing platform system 112. Stringent background checks can increase driver safety and passenger safety. The passenger 104 can provide the ridesharing platform system 112 with a pickup or starting location and a drop off or destination location of a trip and receive pricing information (e.g., the estimated cost of the trip) and timing information (e.g. the estimated duration of the trip). If the pricing information and timing information are acceptable to the passenger 104, the passenger 104 can make a trip request or place an order (e.g., by clicking an order button) to the ridesharing platform system 112. After receiving the trip request from the passenger 104, the ridesharing platform system 112 can decide whether to accept the trip request and assign or match the driver 116 to the passenger for the particular trip request. Declining or rejecting a trip request of a passenger determined to be likely an offender in an incident can increase driver safety. The driver 116 can proceed to and arrive at the pickup location, where the passenger 104 can enter the driver's vehicle 116*v* and be transported, by the driver 116 using the vehicle 116*v*, to the drop off location of the trip request or order. The passenger 104 can pay (e.g., with cash or via the ridesharing platform system 112) the driver 116 after arrival at the drop off location.

Using the passenger device 104*d*, the passenger 104 can interact with the ridesharing platform system 112 and request ridesharing services. For example, the passenger 140, using the passenger device 104*d*, can make a trip request to the ridesharing platform system 112. A trip request can include rider identification information, the number of passengers for the trip, a requested type of the provider (e.g., a vehicle type or service option identifier), the pickup location (e.g., a user-specified location, or a current location of the passenger device 104*d* as determined using, for example, a global positioning system (GPS) receiver), and/or the destination for the trip.

The passenger device 104*d* can interact with the ridesharing platform system 112 through a client application configured to interact with the ridesharing platform system 112. The client application can present information, using a user interface, received from the ridesharing platform system 112 and transmit information to the ridesharing platform system 112. The information presented on the user interface can include driver-related information, such as driver identity, driver vehicle information, driver vehicle location, and driver estimated arrival. The information presented on the user interface can include the drop off location, a route from the pickup location to the drop off location, an estimated trip duration, an estimated trip cost, and current traffic condition. The passenger device 104*d* can include a location sensor, such as a global positioning system (GPS) receiver, that can determine the current location of the passenger device 104*d*. The user interface presented by the client application can include the current location of the passenger device 104. The information transmitted can include a trip request, a pickup location, and a drop off location.

The ridesharing platform system 112 can allow the passenger 104 to specify parameters for the trip specified in the trip request, such as a vehicle type, a pick-up location, a trip destination, a target trip price, and/or a departure timeframe for the trip. The ridesharing platform system 112 can determine whether to accept or reject the trip request and, if so, assign or attempt to assign the driver 116 with the driver vehicle 116*v* and the driver device 116*d* to the passenger 104 and the passenger's trip request. For example, the ridesharing platform system 112 can receive a trip request from the passenger device 104*d*, select a driver from a pool of available drivers to provide the trip, and transmit an assignment request to the selected driver's device 116*d*.

The driver 116 can interact with, via the driver device 116*d*, the ridesharing platform system 112 to receive an assignment request to fulfill the trip request. The driver can decide to start receiving assignment requests by going online (e.g., launching a driver application and/or providing input on the driver application to indicate that the driver is receiving assignments), and stop receiving assignment requests by going offline. The driver 116 can receive, from the ridesharing platform system 112, an assignment request to fulfill a trip request made by the passenger using the passenger device 104*d* to the ridesharing platform system 112. The driver 116 can, using the driver device 116*d*, accepting or reject the assignment request. By accepting the assignment request, the driver 116 and the driver's vehicle 116*v* is assigned to the particular trip of the passenger 104, and is provided the passenger's pickup location and trip destination.

The driver device 116*d* can interact with the ridesharing platform system 112 through a client application configured to interact with the ridesharing platform system 112. The client application can present information, using a user interface, received from the ridesharing platform system 112 (e.g., an assignment request, a pickup location, a drop off location, a route from the pickup location to the drop off location, an estimated trip duration, current traffic condition, and passenger-related information, such as passenger name and gender) and transmit information to the ridesharing platform system 112 (e.g., an acceptance of an assignment request). The driver device 116d can include a location sensor, such as a global positioning system (GPS) receiver, that can determine the current location of the driver device 116d. The user interface presented by the client application can include the current location of the driver device 116 and a route from the current location of the driver device 116 to the pickup location. After accepting the assignment, the driver 116, using the driver's vehicle 116v, can proceed to the pickup location of the trip request to pick up the passenger 104.

The passenger device 104d and the driver device 116d can communicate with the ridesharing platform system 112 via the network 108 The network 108 can include one or more local area and wide area networks employing wired and/or wireless communication technologies (e.g., 3G, 4G, and 5G), one or more communication protocols (e.g., transmission control protocol/Internet protocol (TCP/IP) and hypertext transport protocol (HTTP)), and one or more formats (e.g., hypertext markup language (HTML) and extensible markup language (XML).

Augmented Passenger Verification

Figure 2:
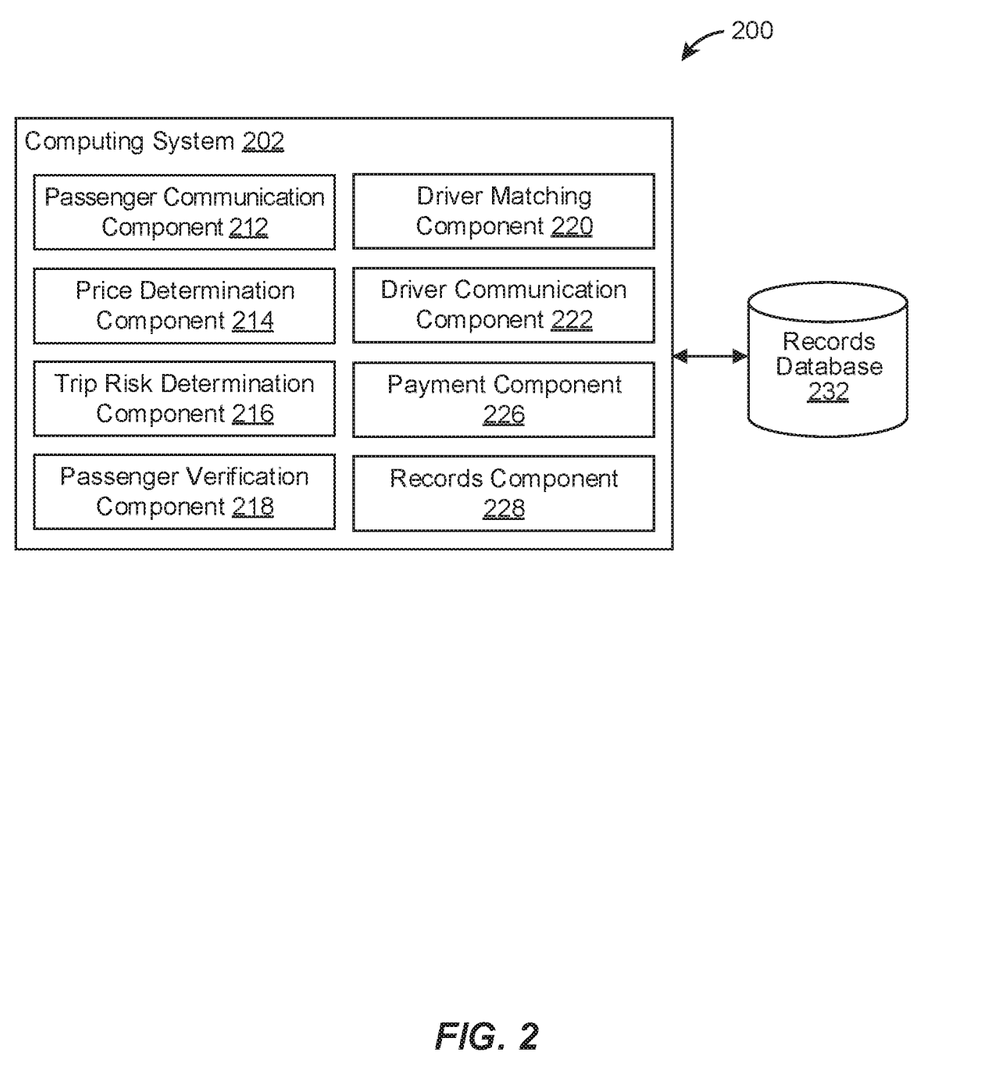
FIG. 2 illustrates an example environment of a ridesharing platform system, in accordance with various embodiments of the disclosure.

FIG. 2 illustrates an example environment 200 for a ridesharing platform system, in accordance with various embodiments. The example environment 200 may include a ridesharing computing system 202. The computing system 202 may include one or more processors and memory (e.g., permanent memory, temporary memory). The processor(s) may be configured to perform various operations by interpreting machine-readable instructions stored in the memory. The computing system 202 may include other computing resources. The computing system 202 may have access (e.g., via one or more connections, via one or more networks) to other computing resources.

The computing system 202 may include a passenger communication component 212, a price determination component 214, a trip risk determination component 216, a passenger verification component 218, a driver matching component 220, a driver communication component 224, a payment component 226, and a trip records component 228. The computing system 202 may include other components. While the computing system 202 is shown in FIG. 2 as a single entity, this is merely for ease of reference and is not meant to be limiting. One or more components or one or more functionalities of the computing system 202 described herein may be implemented in software. One or more components or one or more functionalities of the computing system 202 described herein may be implemented in hardware. One or more components or one or more functionalities of the computing system 202 described herein may be implemented in a single computing device or multiple computing devices. In some embodiments, one or more components or one or more functionalities of the computing system 202 described herein may be implemented in one or more networks (e.g., enterprise networks), one or more endpoints, one or more servers, or one or more clouds.

A passenger, such as the passenger 104 described with reference to FIG. 1 (or a passenger's device, such as the passenger device 104 described with reference to FIG. 1) can communicate with the ridesharing computing system 202 via the passenger communication component 212. For example, during the trip request process, the passenger can provide personal information to the ridesharing computing system 202 via the passenger communication component 212. For example, the passenger can provide the ridesharing computing system 202, via the passenger communication component 212, with a pickup location and a drop off location of a trip. For example, the passenger communication component 212 can provide the passenger with pricing information of the trip (e.g., the estimated cost of the trip) and timing information of the trip (e.g. the estimated duration of the trip). If the pricing information and timing information are acceptable to the passenger, the passenger can make a trip request or place an order (e.g., by clicking an order button) to the ridesharing computing system 202, via the passenger communication component 212. After receiving the trip request from the passenger, the ridesharing computing system 202 can determine whether to accept or decline the trip request or order based on a risk of the trip determined by the risk determination component 216. The risk determination component 216 can determine the risk of the trip using the verification information provided the passenger and the validity of the verification information determined by the passenger verification component 218. If the risk is acceptable (e.g., below a threshold level), the ridesharing computing system 202 can assign or match the driver to the passenger for the particular trip request using the driver matching component 220. The ridesharing computing system 202, using the driver communication component 224, can provide the assigned driver with an assignment of the trip request. The ridesharing computing system 202, using the driver communication component 224, can receive the driver's acceptance of the assignment of the trip request. The driver communication component 224 can provide the driver with information relating to the progress of the trip, such as the driver's distances from the pickup location and drop off location and a route from the pickup location to the drop off location. The ridesharing computing system 202, using the payment component 226, can receive the passenger's payment for the trip. The records component 228 can store information related to the trip (e.g., the driver information) in the records database 232. The records database 232 can also store the passenger information and the driver information (e.g., received during the registration process, such as the passenger's name, or trip request process).

Augmented Passenger Verification Interactions

Figure 3:
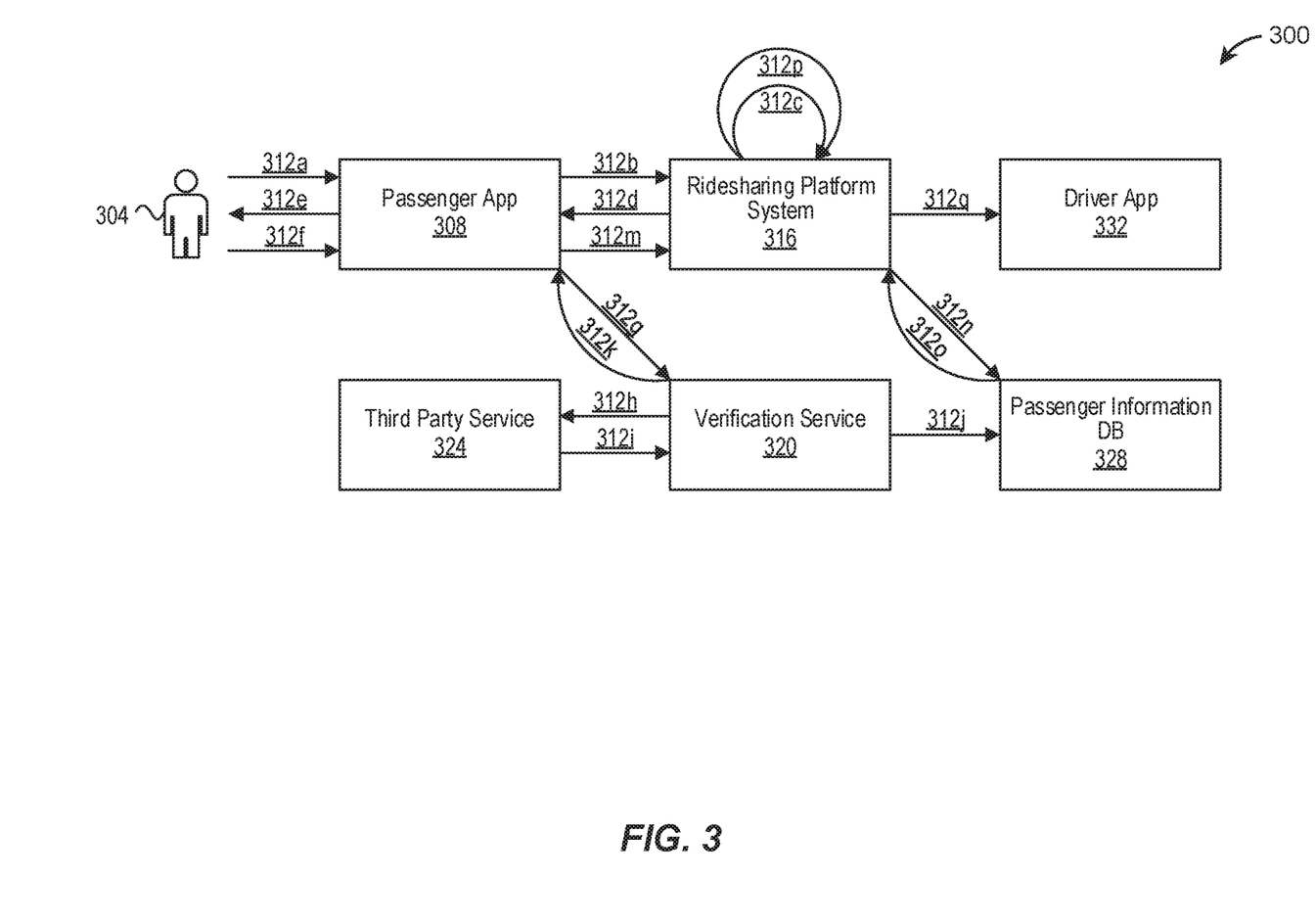
FIG. 3 illustrates an example interaction diagram for augmented passenger verification, in accordance with various embodiments of the disclosure.

FIG. 3 illustrates an example interaction diagram for augmented passenger verification, in accordance with various embodiments of the disclosure. A passenger 304 can use a passenger application 308 to make a trip request or place a trip order with a ridesharing platform system 316 at interaction 312a. The passenger application 308 can be a mobile application, such as an App of the a passenger application 308, or a web browser.

At interaction 312b, the ridesharing platform system 316 can receive a trip order for an account from a user device implementing the passenger application 308. The trip order can be associated with a plurality of conditions. The plurality of conditions can comprise the trip order being a first trip order of the account. The plurality of conditions can comprise a pickup time and/or a drop off time associated with the trip order being night time. The plurality of conditions can comprise the account and/or the first trip order being associated with only a cash payment method. The plurality of conditions can comprise a pickup location and/or the drop off location associated with the trip order being an unsafe location. The plurality of conditions can comprise a route from the pickup location to the drop off location passing through an unsafe area. For example, the trip order can be a first trip order of the account, the pickup time of the trip order is night time (e.g., about 20:00, about 22:00, about 0:00, or about 2:00), and the trip order is being paid with cash. For example, the account has been registered recently, the trip order is not a first trip order of the account, the pickup time of the trip order is night time (e.g., about 20:00, about 22:00, about 0:00, or about 2:00), all previous trip order(s) have been paid with cash, and the trip order is being paid with cash.

At action 312c, the ridesharing platform system 316 can determine the trip order has a high risk using a plurality of conditions associated with the trip order. The ridesharing platform system can determine a risk associated with the trip order using the plurality of conditions associated with the trip order. The ridesharing platform system can determine the risk is above a predetermined threshold. Alternatively or additionally, the ridesharing platform system can determine a number of the plurality of conditions that are suspicious is above a threshold. Suspicious conditions can include the trip order is a first trip order of the account, the pickup time of the trip order is night time (e.g., about 20:00, about 22:00, about 0:00, or about 2:00), and the trip order is being paid with cash.

At interaction 312d, the ridesharing platform system 316 can send a request to the passenger application 308 for the passenger 304 of the account to provide verification information. The verification information can be unavailable to the ridesharing platform system 316. For example, the ridesharing platform system 316 can transmit a message to the passenger application 308 that the passenger 304 associated with the account can using the passenger application to provide verification information. The verification information of the passenger 304 can comprise two or more types of verification information. The two or more types of verification information can comprise a credit card number and associated information and an identification number and associated information. The credit card number and associated information can comprise a credit card number, an expiration date an address, a security number, or a combination thereof. The identification number and associated information can comprise a state identification number, a national identification number, a passport number, an issuance date, an expiration date, an issuance authority, a date of birth, or a combination thereof.

At interaction 312e, the passenger application 308 can request the passenger 304 provide verification information. At interaction 312f, the passenger application 308 can receive verification information from the passenger 304.

For verification using a credit card number and associated information (e.g., an expiration date and a security number), or an identification number or associated information (e.g., a date of issuance, or a date of expiration), the passenger application 308 can transmit the verification information received from the passenger to a verification system or service 320 at interaction 312g. At interactions 312h, 312i, the verification system 320 can determine the verification information received from the passenger application is valid using a third party service 324, such as a payment or credit card processing system, service, or database. For example, the passenger application 308 of the ridesharing platform system 316 can determine a credit card number and an associated expiration month provided by the passenger as verification information match each other using the validation service 320, which in turn uses the third party service 324 (e.g., a payment or credit card processing system), to verify the credit card number and the associated expiration month match each other.

A registration process of the payment processing system can require more or more stringent requirements than a registration process of the ridesharing system. For example, to obtain a credit card, a user needs to provide a bank with his name, date of birth, home address, a driver license number, and/or a social security number. The verification system 320 can determine the verification information received from the passenger application is valid using a third party service 324, such as an identification number verification system, service, or database. A process of obtaining an identification number verifiable using the identification number verification system can require more or more stringent requirements than the registration process of the ridesharing system. For example, to obtain a government identification number, a person has to provide a government entity with a name, a date of birth, an address, and/or a birth certification.

At interaction 312j, the verification system 320 can cause the verification information received from the passenger application 308, or a portion thereof, to be saved to a passenger information database system 328. For example, the verification system 320 can save the verification information received to the passenger information database 328. The passenger information database 328 can be part of the ridesharing platform system 316. The passenger information database 328 can be part of a passenger information database system accessible by the ridesharing platform system 316.

At interaction 312k, the passenger application 308 can receive an indication that the verification information received from the passenger is valid from the verification system. The passenger application 308 can transmit an updated trip order or resend the trip order for the account to the ridesharing system 316 after receiving the indication that the verification information received from the passenger is valid.

At interaction 312m, the ridesharing platform system 316 can receive an updated trip order for the account. The updated trip order for the account received can be indicative of the valid verification information having been provided for the passenger of the account. The ridesharing platform system can receive an updated trip order for the account from the passenger application 308. The passenger application 308 can receive a request to transmit the updated trip order to the ridesharing platform system from the passenger 304. The passenger application 308 can transmit the updated trip order for the account to the ridesharing platform system 316 responsive to receiving the request to transmit the updated trip order to the ridesharing platform system 316 from the passenger 304.

At interactions 312n, 312o, the ridesharing platform system 316 can request and receive an indication that valid verification information has been provided for the passenger of the account from the passenger information database 328. Alternatively or additionally, the ridesharing platform system 316 can request and receive the verification information provided for the passenger of the account from the passenger information database 328.

At action 312p, the ridesharing platform system 316 can determine a decision for the trip order based on the valid verification information provided for the passenger of the account. The ridesharing platform system 316 can determine whether the verification information provided by the passenger of the account is associated with another account. If so, the ridesharing platform system 316 can decline the trip order, disable the account and/or the other account, and/or suspend the account and/or the second account. For example, the ridesharing platform system 316 can decline a trip order if multiple accounts are associated (e.g., linked) with one credit card number as payment methods. If not, the ridesharing platform system 316 can assign a driver for the trip order. For example, the ridesharing platform system 316 can decline a trip order if multiple accounts are associated (e.g., linked) with one national identification number. Alternatively or additionally, the ridesharing platform system 312p can determine whether the verification information provided by the passenger is consistent with passenger information in a passenger profile associated with the account stored in the passenger information database 328. For example, the ridesharing platform system 316 can determine whether the age information in the passenger profile associated with the account is consistent (e.g., within a threshold number of years) with the age information associated with the identification number provided by the passenger. If so, the ridesharing platform system 316 can assign a driver for the trip order.

At interaction 312q, the ridesharing platform system 316 can notify a driver application, or a user device implementing the driver application, of the assignment of the trip order.

Figure 4:
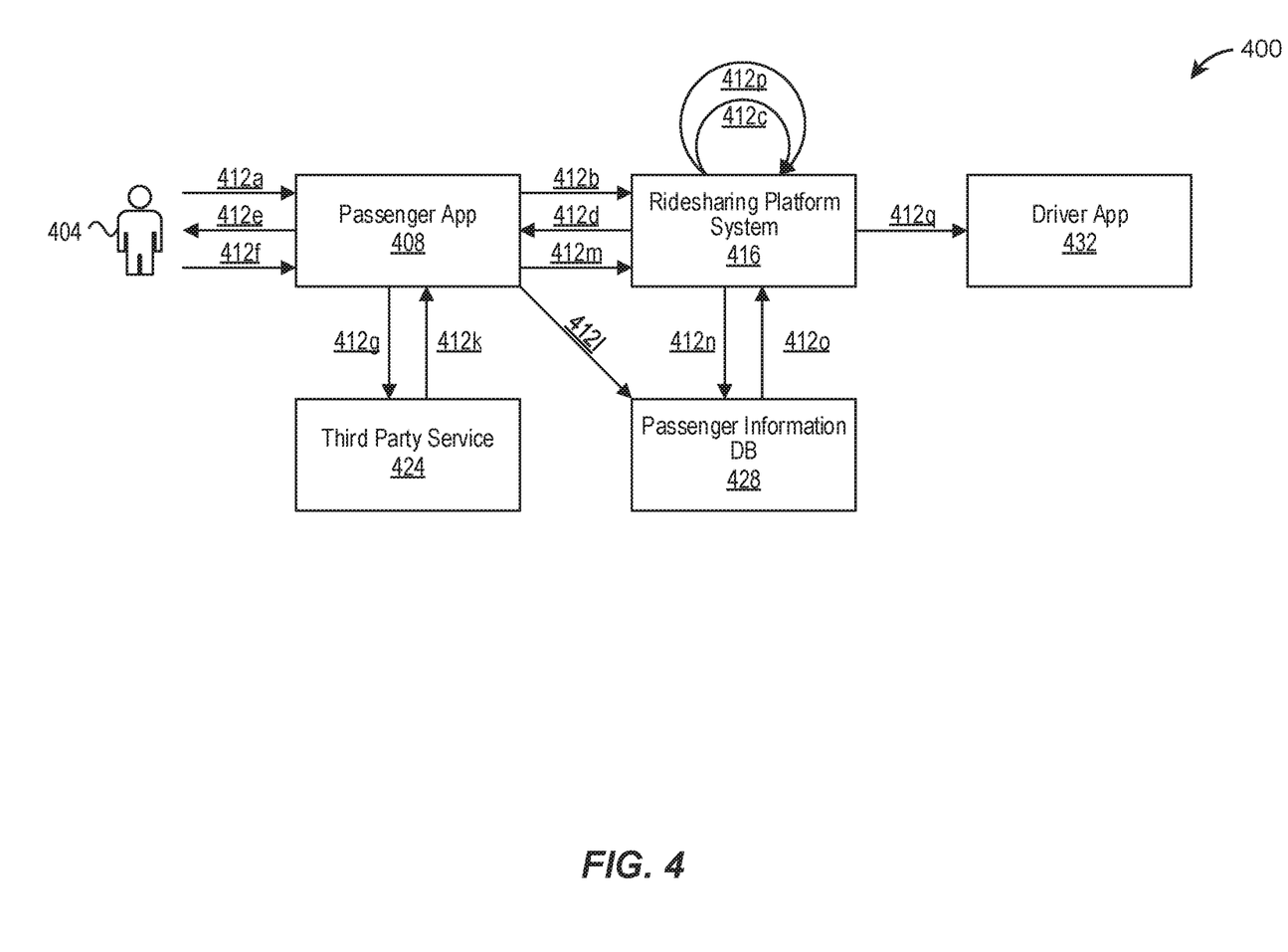
FIG. 4 illustrates an example interaction diagram for augmented passenger verification, in accordance with various embodiments of the disclosure.

FIG. 4 illustrates another example interaction diagram for augmented passenger verification, in accordance with various embodiments of the disclosure. A passenger 404 can use a passenger application 408 (e.g., a mobile application, or a web browser) to make a trip request or place a trip order at interaction 412a. At interaction 412b, a ridesharing platform system 416 can receive a trip order for an account from a user device implementing the passenger application 408. At action 412c, the ridesharing platform system 416 can determine the trip order has a high risk using a plurality of conditions associated with the trip order. At interaction 412d, the ridesharing platform system 416 can send a request to the passenger application 408 for the passenger 404 of the account to provide verification information. The verification information can be unavailable to the ridesharing platform system 416. The verification information can comprise login information of an online system (e.g., a social media system, such as Facebook®, Twitter®, Instagram®, YouTube®, and LinkedIn®. The login information can include a username, a password, an answer to a security question, or a combination thereof. At interaction 412e, the passenger application 408 can request the passenger provide verification information. At interaction 412f, the passenger application 408 can receive verification information from the passenger 404.

For verification using login information of an online account (e.g., a social media account), the passenger application 408 can transmit the verification information (e.g., a username and password) received from the passenger 404 to a third party service 424 (e.g., an online system, which can be a social media system, such as Facebook®) at interaction 412g. At interaction 412k, the passenger application 408 can receive an indication that the verification information received from the passenger 404 is valid from the third party service 424. For example, the passenger application 408 of the ridesharing platform system 416 can determine the login information of the third party service 424 provided by the passenger is valid using an application program interface (API) and/or software development kit (SDK) of the third party service 424.

At interaction 412l, the passenger application 408 can cause the indication that the verification information received from the passenger is valid to be saved to a passenger information database 428. For example, the passenger application 408 can save the indication that the verification information received from the passenger is valid to the passenger information database 428 without saving the actual verification information to the passenger information database 428. An account creation process of the online system can require more or more stringent requirements than a registration process of the ridesharing platform system 416. For example, to create an account of the third party service 424, a user may need to provide a user name, a password, a phone number, or a combination thereof. The third party service 424 can send a verification code to the phone number and ask the user to provide the verification code during the account creation process. As another example, the online system may not allow a phone number to be used for too many accounts, such as 5, 10, or more.

At interaction 412m, the ridesharing platform system 416 can receive an updated trip order (or the trip order again) for the account from the passenger application 408. The passenger application 408 can transmit the updated trip order for the account to the ridesharing platform system 416 responsive to receiving a request to transmit the updated trip order to the ridesharing platform system 416 from the passenger 404. At interactions 412n, 412o, the ridesharing platform system 416 can request and receive an indication that valid verification information has been provided for the passenger of the account from the passenger information database 428.

At action 412p, the ridesharing platform system 416 can determine a decision for the trip order based on the valid verification information provided for the passenger 404 of the account.

Augmented Passenger Verification Method

Figure 5:
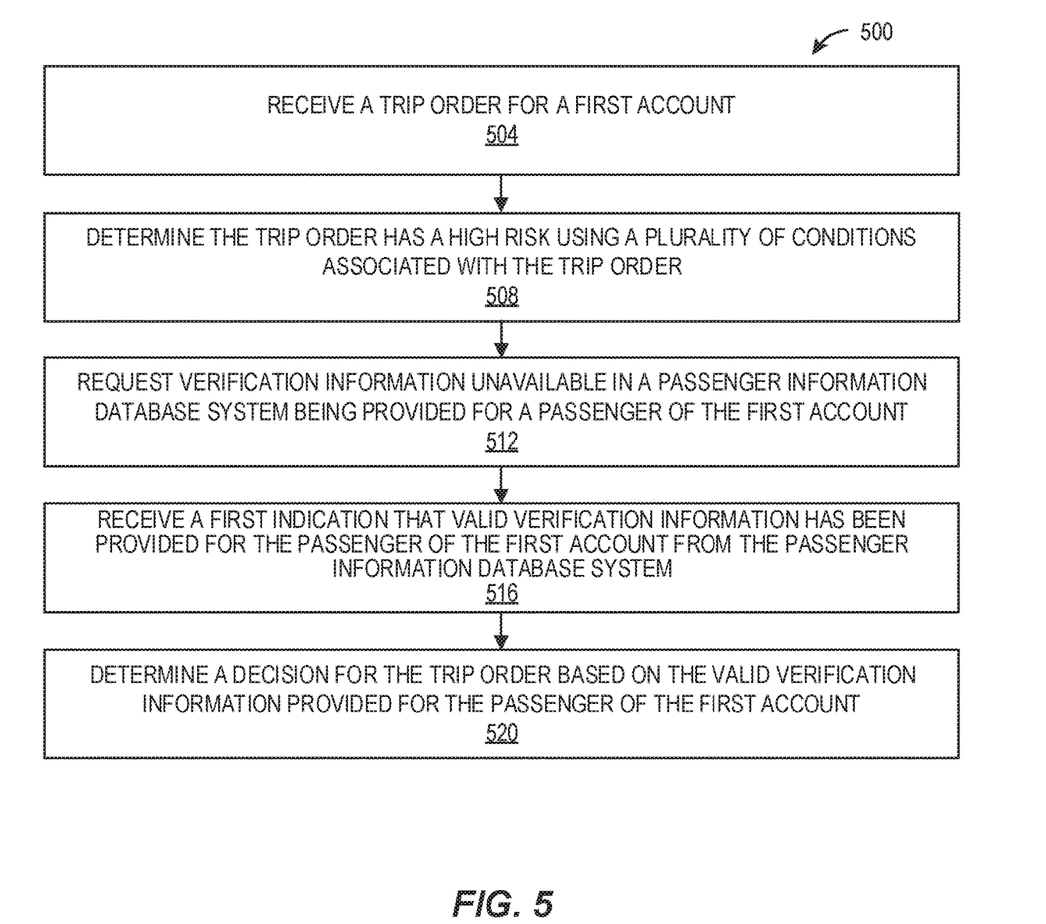
FIG. 5 is a flowchart of an example method for augmented passenger verification, in accordance with various embodiments of the disclosure.

FIG. 5 illustrates a flowchart of an example method 500, according to various embodiments of the present disclosure. The method 500 may be implemented in various environments including, for example, the environment 200 of FIG. 2 and by computer systems, such as the computer system 202 of FIG. 2, the computing system 316 of FIG. 3, the computing system 416 of FIG. 4, or the computer system 600 of FIG. 6. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 504, a computer system (such as the computer system 202 of FIG. 2, the computing system 316 of FIG. 3, the computing system 416 of FIG. 4, or the computer system 600 of FIG. 6) can receiving a trip order for an account. The computing system can receive the trip order from a passenger device (e.g., implementing a passenger application, a mobile application, or a trip ordering application, such as a web browser) associated with the account.

The trip order can be associated with a plurality of conditions. The plurality of conditions can comprise the trip order being a first trip order of the account. The plurality of conditions can comprise a pickup time and/or a drop off time associated with the trip order being night time. The plurality of conditions can comprise the account and/or the first trip order being associated with only a cash payment method. The plurality of conditions can comprise a pickup location and/or the drop off location associated with the trip order being an unsafe location. The plurality of conditions can comprise a route from the pickup location to the drop off location passing through an unsafe area. For example, the trip order can be a first trip order of the account, the pickup time of the trip order is night time (e.g., about 20:00, about 22:00, about 0:00, or about 2:00), and the trip order is being paid with cash. For example, the account has been registered recently, the trip order is not a first trip order of the account, the pickup time of the trip order is night time (e.g., about 20:00, about 22:00, about 0:00, or about 2:00), all previous trip order(s) have been paid with cash, and the trip order is being paid with cash.

With respect to the method 500, at block 508, the computer system can determine the trip order has a high risk using the plurality of conditions associated with the trip order. The computer system can determine a risk associated with the trip order using the plurality of conditions associated with the trip order. The computing system can determine the risk is above a predetermined threshold. The computing system can determine a number of the plurality of conditions that are suspicious is above a threshold. Suspicious conditions can include the trip order is a first trip order of the account, the pickup time of the trip order is night time (e.g., about 20:00, about 22:00, about 0:00, or about 2:00), and the trip order is being paid with cash.

With respect to the method 500, at block 512, the computer system can request verification information unavailable in a passenger information database being provided for a passenger of the account. The passenger information database can be operationally coupled to the computing system. For example, the passenger information database can be part of the computing system. As another example, the passenger information database can be part of a passenger information database system accessible by the computing system. The computing system can transmit, to the mobile application, a request for the mobile application to be provided with the verification information unavailable in the passenger information database. For example, the computing system can transmit a message to the mobile application that the passenger associated with the account using the mobile application to provide verification information.

The mobile application can receive the request for the mobile application to be provided with the verification unavailable in the passenger information database, from the computing system. The mobile application can request the passenger provide verification information. The mobile application can receive verification information from the passenger. The verification information of the passenger can comprise two or more types of verification information. The two or more types of verification information can comprise a credit card number and associated information, an identification number and associated information, and login information of an online system (e.g., a social media system, such as Facebook®, Twitter®, Instagram®, YouTube®, and LinkedIn®. The credit card number and associated information can comprise a credit card number, an expiration date an address, a security number, or a combination thereof. The identification number and associated information can comprise a state identification number, a national identification number, a passport number, an issuance date or month, an expiration date or month, an issuance authority, a date of birth of the person having the identification number or passport number, or a combination thereof. The login information can include a username, a password, an answer to a security question, or a combination thereof. The passenger can be asked to provide two or more elements of a type of verification information. For example, the passenger can be asked to provide a national identification number and an issuance date. As another example, the passenger can be asked to provide a national identification number and a date of birth.

With respect to the method 500, at block 516, the computer system can receive an indication that valid verification information has been provided for the passenger of the account from the passenger information database. The computing system can receive an updated trip order (or the trip order again) for the account. The updated trip order for the account received can be indicative of the valid verification information having been provided for the passenger of the account. The computing system can receive an updated trip order for the account from the mobile application. The mobile application can receive a request to transmit the updated trip order to the computing system from the passenger. The mobile application can transmit the updated trip order for the account to the computing system responsive to receiving the request to transmit the updated trip order to the computing system from the passenger.

For verification using a credit card number and associated information (e.g., an expiration date and a security number), or an identification number or associated information (e.g., a date of issuance, or a date of expiration), the mobile application can transmit the verification information received from the passenger to a verification system. The verification system can be operationally coupled to the computing system. The verification system can be part of the system. Alternatively, the verification system can be a separate system accessible by the system. The mobile application can receive an indication that the verification information received from the passenger is valid from the verification system. The mobile application can transmit an updated trip order or resend the trip order for the account to the ridesharing system.

The verification system can determine the verification information received from the mobile application is valid using a third party service, such as a payment or credit card processing system, service, or database. For example, the verification information can include a credit card number and an associated expiration month. The verification system can determine the credit card number and the associated expiration month match each other using a third party service (e.g., a payment or credit card processing service), to verify the credit card number and the associated expiration month match each other.

Alternatively or additionally, the verification system can determine the verification information received from the mobile application is valid using an identification number verification system, service, or database. A registration process of the payment processing system can require more or more stringent requirements than a registration process of the ridesharing system. For example, to obtain a credit card, a user needs to provide a bank with his name, date of birth, home address, a driver license number, and/or a social security number. A process of obtaining an identification number verifiable using the identification number verification system can require more or more stringent requirements than the registration process of the ridesharing system. For example, to obtain a government identification number, a person has to provide a government entity with a name, a date of birth, an address, and/or a birth certification. The verification system can cause the verification information received from the mobile application, or a portion thereof, to be saved to the passenger information database system. For example, the verification system can save the verification information received to the passenger information database.

For verification using login information of an online account (e.g., a social media account), the mobile application can transmit the verification information (e.g., a username and password) received from the passenger to an online system (e.g., a social media system, such as Facebook®). The mobile application can receive an indication that the verification information received from the passenger is valid from the online system. For example, the verification information can include login information of the online system. The mobile application can determine the login information of an online system provided by the passenger is valid using an application program interface (API) and/or software development kit (SDK) of the online system.

The mobile application can cause the indication that the verification information received from the passenger is valid to be saved to the passenger information database system. For example, the mobile application can save the indication that the verification information received from the passenger is valid to the passenger information database system without saving the actual verification information to the passenger information database system. An account creation process of the online system can require more or more stringent requirements than a registration process of the ridesharing system. For example, to create an account of the online system, a user may need to provide a user name, a password, a phone number, or a combination thereof. The online system can send a verification code to the phone number and ask the user to provide the verification code during the account creation process. As another example, the online system may not allow a phone number to be used for too many accounts, such as 5, 10, or more.

With respect to the method 500, at block 520, the computer system can determine the decision for the trip order based on the valid verification information provided for the passenger of the account. The computing system can determine whether the verification information being provided by the passenger of the account is associated with another account. If so, the computing system can decline the trip order, disable the account and/or the other account, and/or suspend the account and/or the second account. For example, the computing system can decline a trip order if multiple accounts are associated (e.g., linked) with one credit card number as payment methods. If not, the computing system can assign a driver for the trip order. For example, the computing system can decline a trip order if multiple accounts are associated (e.g., linked) with one national identification number.

Alternatively or additionally, the computing system can determine whether the verification information being provided by the passenger is consistent with passenger information in a passenger profile associated with the account stored in the passenger information database system. For example, the computing system can determine whether the age information in the passenger profile associated with the account is consistent (e.g., within a threshold number of years) with the age information associated with the identification number provided by the passenger. If so, the computing system can assign a driver for the trip order. If not, the computing system can decline the trip order, disable the account, and/or suspend the account.

In some embodiments, the computer system can determine the decision for the trip order based on the risk for the driver for the trip order. The risk for the driver can be determined based on the gender of the passenger. The risk for the driver can be determined based on the passenger's prior behavior, such as the number of recent trip orders, the number of recent canceled trip orders, and driver identities and car models of the recent trip orders and canceled trip orders. The risk for the driver can be determined based on the pickup location, the drop off location, the pickup time, the estimated drop off time, the estimated trip duration of the trip order, and the estimated route for the trip order. The risk for the driver can be determined based on the review of the passenger by drivers who have provided transportation services for the passenger. The decision for the trip order can be an acceptance of the trip order and a decline of the trip order. The decision for the trip order can be a particular driver to assign to the trip order.

Computer System

Figure 6:
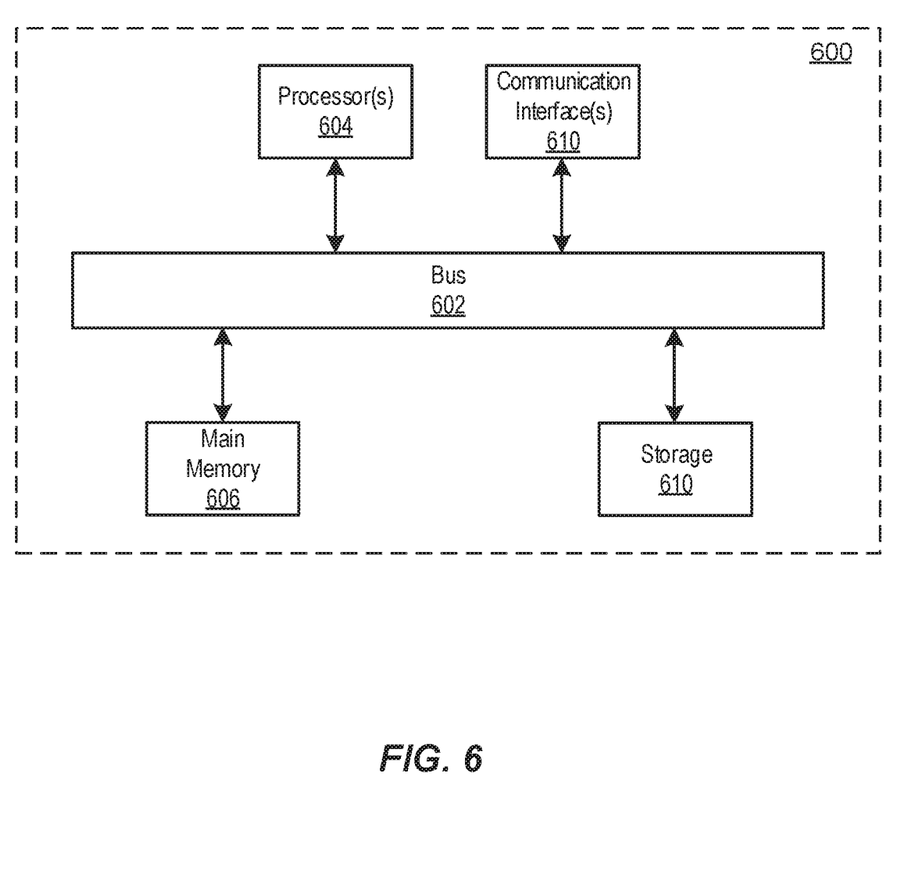
FIG. 6 is a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein. For example, the process/method shown in FIG. 5 and described in connection with this figure may be implemented by computer program instructions stored in main memory 606. When these instructions are executed by processor(s) 604, they may perform the steps as shown in FIG. 5 and described above. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A ridesharing system comprising:
one or more processors; and
a memory storing instructions that, when executed by the one or more processors, cause the system to perform:
receiving a trip order for a first account;
determining the trip order has a high risk using a plurality of conditions associated with the trip order;
sending a request to a passenger application for verification information unavailable in a passenger information database being provided for a passenger of the first account;
receiving, from the passenger application, the verification information comprising login information of a third-party online system;
triggering application program interfaces (APIs) of the third-party online system with the login information of the third-party online system in the received verification information;
determining the verification information is valid based on responses from the APIs;
storing a first indication that the valid verification information has been provided for the passenger of the first account into the passenger information database, wherein the storing of the first indication comprises:
excluding the login information of the third-party online system from being stored in the passenger information database; and
determining a decision for the trip order based on the valid verification information provided for the passenger of the first account.

2. The system of claim 1, wherein the plurality of conditions comprises the trip order being a first trip order of the first account, a pickup time and/or a drop off time associated with the trip order being night time, the first account and/or the first trip order being associated with only a cash payment method, a pickup location and/or the drop off location associated with the trip order being an unsafe location, and a route from the pickup location to the drop off location passing through an unsafe area.

3. The system of claim 1, wherein determining the trip order has a high risk comprises:
determining a risk associated with the trip order using the plurality of conditions associated with the trip order; and
determining the risk is above a predetermined threshold.

4. The system of claim 1, wherein receiving the trip order comprises:
receiving, from the passenger application associated with the first account, the trip order.

5. The system of claim 4, wherein the passenger application is programmed to perform:
receiving, from the ridesharing system, the request for the passenger application to be provided with the verification information unavailable in the passenger information database;
requesting the passenger provide verification information;
receiving, from the passenger, verification information, wherein the verification information further comprises an identification issued by another entity;
transmitting, to a verification system, the verification information received from the passenger;
receiving, from the verification system, a second indication that the verification information received from the passenger is valid; and
transmitting, to the ridesharing system, an updated trip order for the first account, and
wherein the ridesharing system is programmed to perform: receiving the updated trip order for the first account.

6. The system of claim 5, wherein the passenger application is programmed to:
receiving, from the passenger, a request to transmit, to the ridesharing system, the updated trip order, and wherein transmitting, to the ridesharing system, the updated trip order for the first account comprises: responsive to receiving, from the passenger, the request to transmit, to the ridesharing system, the updated trip order.

7. The system of claim 5,
wherein the verification system is programmed to: determining the verification information received from the passenger application is valid using a payment processing system or an identification number verification system,
wherein a registration process of the payment processing system requires more and/or more stringent requirements than a registration process of the ridesharing system, and/or
wherein a process of obtaining an identification number verifiable using the identification number verification system requires more and/or more stringent requirements than the registration process of the ridesharing system.

8. The system of claim 1, wherein the third-party online system comprises a social media system.

9. The system of claim 1, wherein an account creation process of the third-party online system requires more stringent requirements than a registration process of the ridesharing system.

10. The system of claim 1, wherein the instructions, when executed by the one or more processors, cause the system to perform:
receiving an updated trip order for the first account, wherein the updated trip order for the first account received is indicative of the valid verification information having been provided for the passenger of the first account.

11. The system of claim 1, wherein the verification information of the passenger comprises two or more types of verification information.

12. The system of claim 11, wherein the two or more types of verification information comprise a credit card number and associated information, an identification number and associated information, and login information of an online system.

13. The system of claim 1, wherein the verification information of the passenger comprises a state identification number, a national identification number, a passport number, a credit card number, an issuance date or month, an expiration date or month, an issuance authority, a date of birth, an address, or a combination thereof.

14. The system of claim 1, wherein determining the decision for the trip order comprises:
determining the verification information being provided by the passenger of the first account is not associated with a second account; and
assigning a driver for the trip order.

15. The system of claim 1, wherein determining the decision for the trip order comprises:
determining the verification information being provided by the passenger of the first account is associated with a second account; and
declining the trip order, disabling the first account and/or the second account, and/or suspending the first account and/or the second account.

16. The system of claim 1, wherein determining the decision for the trip order comprises:
determining the verification information being provided by the passenger is consistent with passenger information in a passenger profile associated with the first account stored in the passenger information database; and
assigning a driver for the trip order.

17. The system of claim 1, wherein determining the decision for the trip order comprises:
determining the verification information being provided by the passenger is not consistent with passenger information in a passenger profile associated with the first account stored in the passenger information database; and
declining the trip order, disabling the first account, and/or suspending the first account.

18. A method for ridesharing comprising:
under control of a processor:
transmitting, to a ridesharing system, a trip order of a first account;
receiving, from the ridesharing system, a request for verification information unavailable in a passenger information database being provided for a passenger of the first account;
requesting the passenger to provide the verification information unavailable in the passenger information database, wherein the verification information comprises login information of a third-party online system;
receiving, from the passenger, the verification information requested;
triggering application program interfaces (APIs) of the third-party online system with the login information of the third-party online system in the received verification information;
determining the verification information received from the passenger is valid based on responses from the APIs;
storing a first indication indicating the verification information being valid into the passenger information database, wherein the storing comprises:
excluding the login information of the third-party online system from being stored in the passenger information database; and
transmitting, to the ridesharing system, an updated trip order for the first account, wherein the ridesharing system is programmed to:
receiving, from the passenger information database, the first indication that valid verification information has been provided for the passenger of the first account; and
determining a decision for the trip order based on the valid verification information provided for the passenger of the first account.

* * * * *